United States Patent [19]

Evans

[11] Patent Number: 4,930,340

[45] Date of Patent: Jun. 5, 1990

[54] CALIBRATION BRACKET FOR VEHICLE HEIGHT SENSOR

[75] Inventor: Anthony C. Evans, Northville, Mich.

[73] Assignee: Kelsey-Hayes Company, Romulus, Mich.

[21] Appl. No.: 409,354

[22] Filed: Sep. 19, 1989

[51] Int. Cl.⁵ ............................................. B60G 11/26
[52] U.S. Cl. ...................................................... 73/1 J
[58] Field of Search ................... 73/1 J; 280/707, 6.1, 280/DIG. 1; 324/202, 208, 226; 336/65, 67; 33/DIG. 1

[56] References Cited

U.S. PATENT DOCUMENTS 4,555,120 11/1985 Frait et al. ........................... 324/208

Primary Examiner—Robert R. Raevis
Attorney, Agent, or Firm—MacMillan, Sobanski & Todd

[57] ABSTRACT

The telescoping housing and shaft of a height sensor for an automotive vehicle are each provided with a boss, and an elongate calibration bracket has a pair of apertures in which said bosses are respectively received, whereby the calibration bracket temporarily locks the housing and shaft in a predetermined relationship with respect to each other.

3 Claims, 5 Drawing Sheets

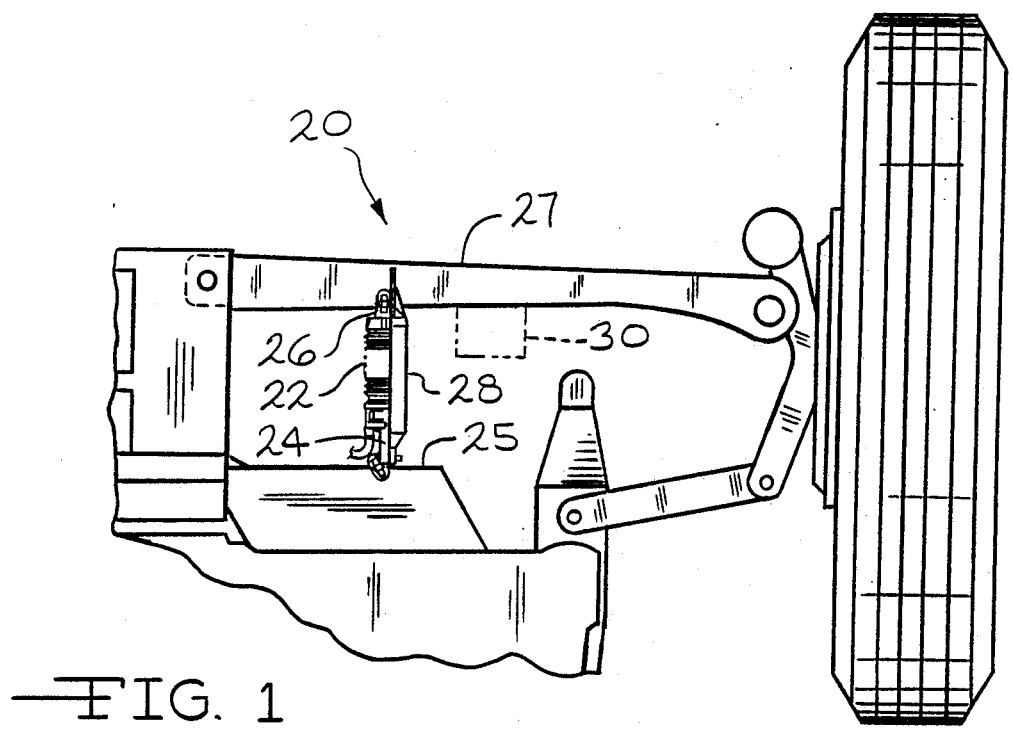
FIG. 1
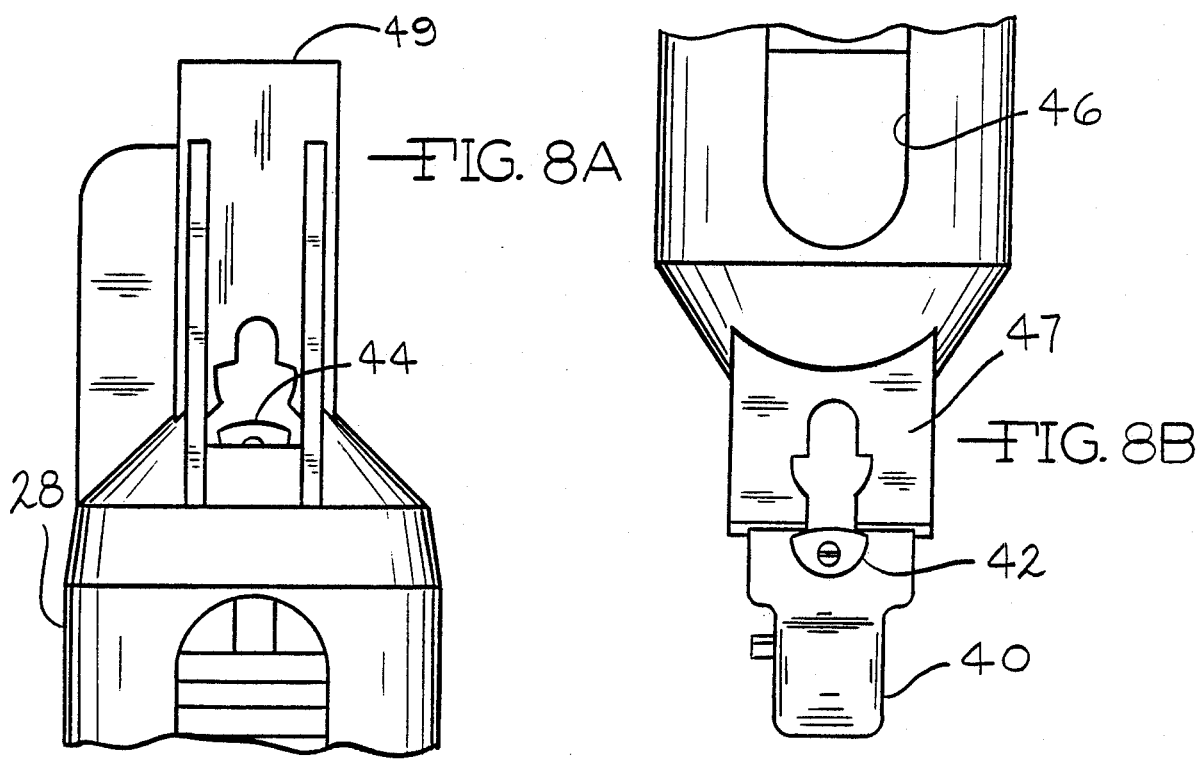
FIG. 8A
FIG. 8B

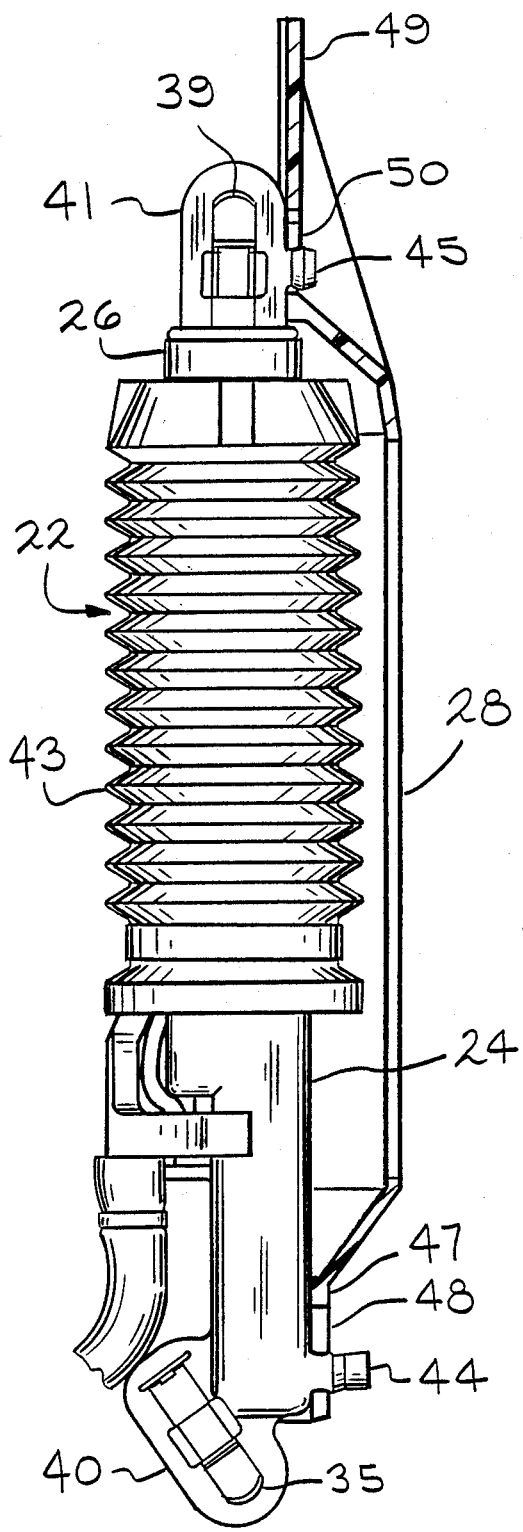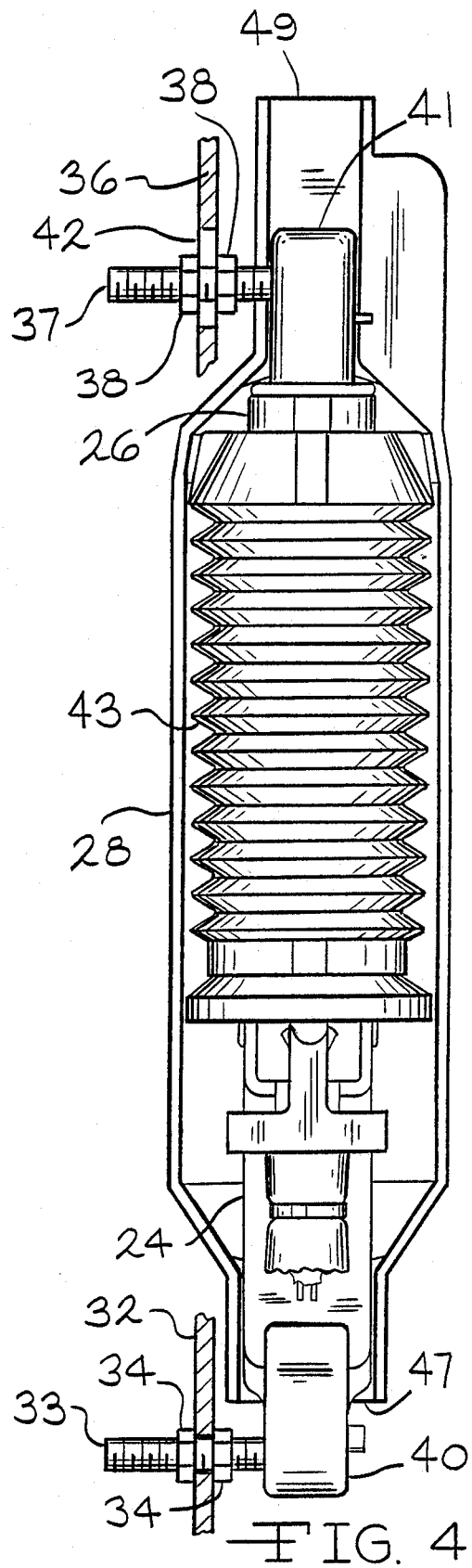

4,930,340

CALIBRATION BRACKET FOR VEHICLE HEIGHT SENSOR

BACKGROUND OF THE INVENTION

This invention relates to a temporary locking bracket for a height sensor of a computer-controlled vehicle suspension system, such as the height sensor disclosed in U.S. Pat. No. 4,555,120, issued to John S. Frait et al. on Nov. 26, 1985. The telescoping shaft and housing of the height sensor of that patent are temporarily ultrasonically spot-welded together in a desired relative position with respect to each other.

SUMMARY OF THE INVENTION

In accordance with the invention, the telescoping shaft and housing of a height sensor are each provided with a boss of a particular shape and are temporarily secured in a desired relative position by a locking bracket temporarily secured to the bosses. The locking bracket can easily be removed after installation of the sensor on a vehicle, is also capable of being automatically stripped away by movement of the vehicle members to which it is attached, and is low in cost so as to be disposable, but can nevertheless be reused if desired.

BRIEF DESCRIPTION OF THE DRAWINGS

FIG. 1 is a fragmentary elevational view of an upside-down vehicle in an assembly line, showing a height sensor attached to the suspension system and a locking bracket of the invention on the height sensor;

FIG. 4 is a view taken from the left-hand side of FIG. 2;

FIG. 5 is a view taken generally along the line 5—5 of FIG. 3, showing the locking bracket of the invention in section;

FIGS. 8A and 8B are enlarged fragmentary views respectively of the upper and lower portions of FIG. 8;

DETAILED DESCRIPTION OF THE PREFERRED EMBODIMENT

Figure 2:
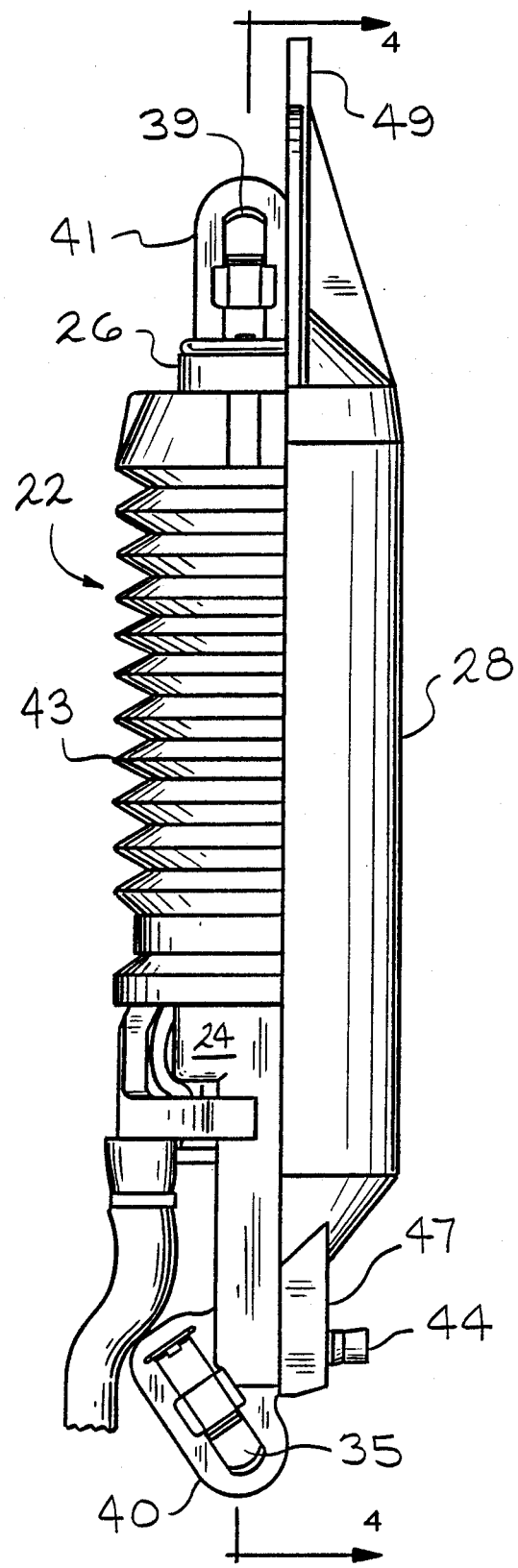
FIG. 2 is an enlarged elevational view of the height sensor and locking bracket of FIG. 1.

With reference to the drawings, FIG. 1 fragmentarily and schematically shows a vehicle 20 in an upside-down position in an assembly line. A height sensor 22 constructed in accordance with the invention is shown with its housing 24 attached to a portion 25 of the vehicle frame and its shaft 26 attached to a suspension arm 27, which is a lower suspension arm when the vehicle 20 is in a normal position. A calibration or locking bracket 28 constructed in accordance with the invention is shown attached at one end to the housing 24 and at an opposite end to the shaft 26.

It will be understood that the shaft 26 carries magnets and the housing 24 has Hall effect switches, such as disclosed in the aforementioned U.S. Pat. No. 4,555,120, and that if the shaft 26 is pulled out beyond a midrange from the housing 24 when the vehicle 20 is in normal position, a Hall effect switch will send a signal to a control unit to release air from an associated air spring of the vehicle 20, and that if the shaft 26 is pushed beyond a midrange into the housing 24, a Hall effect switch will send a signal to the control unit to supply air to the associated air spring of the vehicle 20. With at least three of the height sensors 22 and associated air springs on the vehicle 20, the vehicle will be maintained at the proper height. In the upside-down position of the vehicle 20, a vertically movable support 30 holds the suspension arm 27 in proper position for installation of the height sensor 22, and the locking bracket 28 holds the housing 24 and shaft 26 in proper position relatively to each other during installation of the height sensor.

FIGS. 2-5 show the height sensor 22 and locking bracket 28 in greater detail. A bracket 32 on the frame portion 25 is provided with a stud 33 secured in place by a pair of nuts 34 and having a partially shown ball-shaped head 35. A bracket 36 on the suspension arm 27 is provided with a stud 37 secured in place by a pair of nuts 38 and having a partially shown ball-shaped head 39. The housing 24 is provided with an anchoring lug 40 having a socket in which the head 35 is received, and the shaft 26 is provided with an anchoring lug 41 having a socket in which the head 39 is received. The bracket 36 has a vertical slot 42 in which the stud 37 is adjustable. After the lug 40 is snapped over the ball-shaped head 35, the stud 37 is positioned in the slot 42 so as to enable the lug 41 to be snapped over the ball-shaped head 39. Thereafter the nuts 38 are tightened to lock the stud 37 in position. During the installation, the bracket 28 maintains the housing 24 and shaft 26 in proper relationship relative to each other. A pleated expansible contractible rubber sleeve 43 has one end sealed to the housing 24 and an opposite end sealed to the shaft 26 to protect the delicate parts of the sensor 22.

Figure 3:
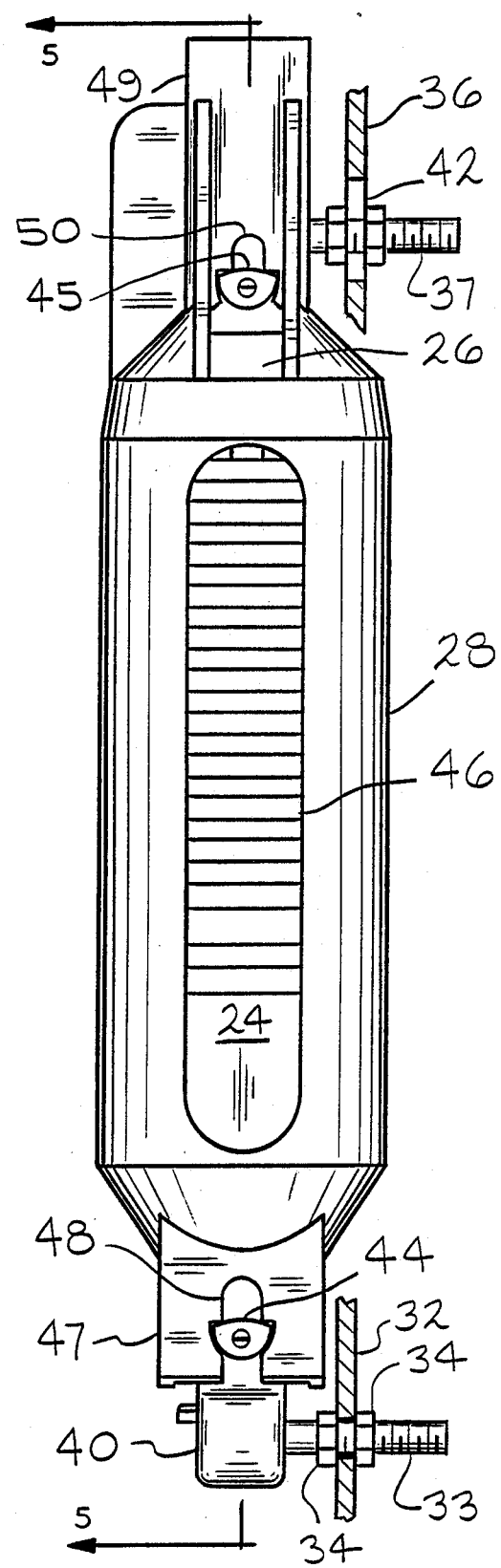
FIG. 3 is a view taken from the right-hand side of FIG. 2, including the mounting studs for the height sensor.
Figure 11:
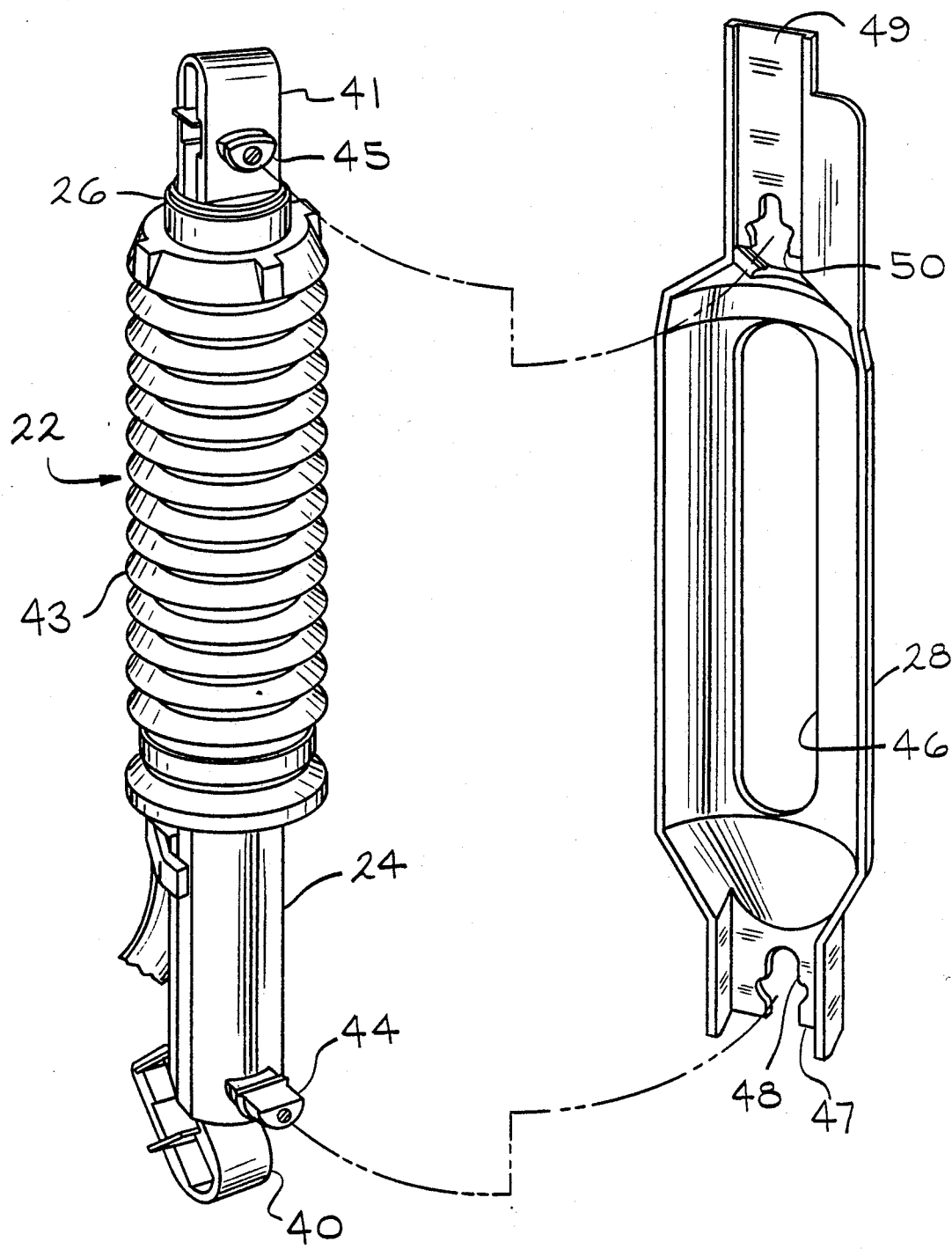
FIG. 11 is an exploded isometric view of the height sensor and of the locking bracket of the invention, illustrating the method of assembling the locking bracket to the height sensor.

In accordance with the invention, the housing 24 is provided with a particularly shaped boss 44 and the shaft 26 is provided with a particularly shaped boss 45. Also in accordance with the invention, the bracket 28 is provided to temporarily lock the housing 24 and shaft 26 in proper position relatively to each other during shipment, storage, and installation on a vehicle such as the vehicle 20. The bracket 28 is generally arcuate in cross-section to partially surround the sensor 22. Preferably it is made of a bright-colored plastic and provided with an elongate slot 46 for saving of material. At its lower end, in the upside-down position of the vehicle 20, the bracket 28 is provided with a flat portion 47 having a vertical slot 48 shaped as shown in FIG. 3. At its upper end, the bracket 28 is provided with a flat portion 49 having an aperture 50 shaped as shown in FIG. 3. At the wide portion of the slot 48, the flat portion 47 is snapped over an enlarged portion of the boss 44, and at a wide portion of the aperture 50, the flat portion 49 is snapped over an enlarged portion of the boss 45. Preferably the locking bracket 28 is assembled with the height sensor 22 before shipment to a manufacturer of automotive vehicles. An exploded isometric view of the height sensor 22 and the locking bracket 28 is shown in FIG. 11.

After installation of the height sensor 22 with the locking bracket 28 on the vehicle 20, the bracket 28 can easily be removed by a worker, but can also be automatically stripped away by movement of the suspension arm 27. FIGS. 6–10 illustrate the automatic stripping away of the locking bracket 28.

Figure 6:
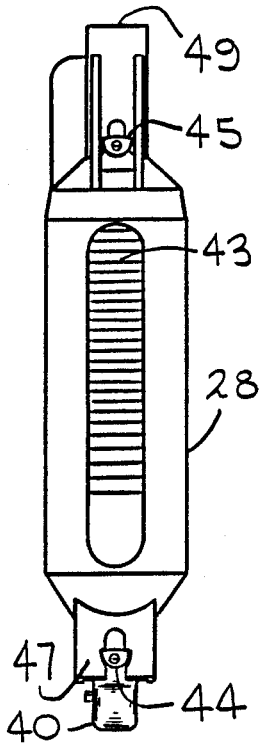
FIG. 6 is a view similar to FIG. 3, showing the locking bracket of the invention in place on the height sensor.
Figure 7:
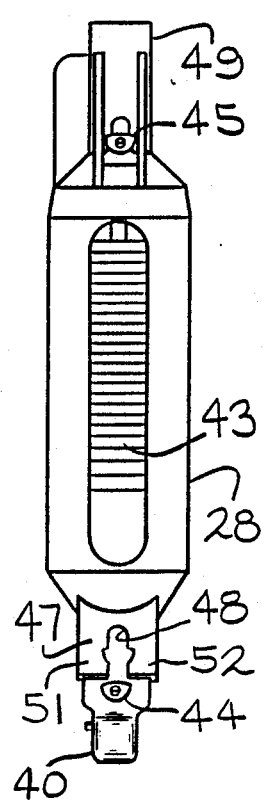
FIG. 7 is a view similar to FIG. 6, but showing the lower portion of the locking bracket stripped off the mounting boss on the housing of the height sensor, as occurs when the shaft of the height sensor is extended by raising the suspension arm of the upside-down vehicle of FIG. 1.

The bracket and sensor assembly is shown in FIG. 6. In FIG. 7, raising of the suspension arm 27 has extended the shaft 26 from the housing 24 and moved the bosses 44 and 45 farther apart, causing the generally flat upper surface of the boss 45 to push up on the portion 49 and pull the flat portion 47 off the boss 44. The lower surface of the boss 44 acts as a rounded wedge to force leg portions 51 and 52 on opposite sides of the slot 48 apart until the boss 44 becomes free of the flat portion 47.

Figure 8:
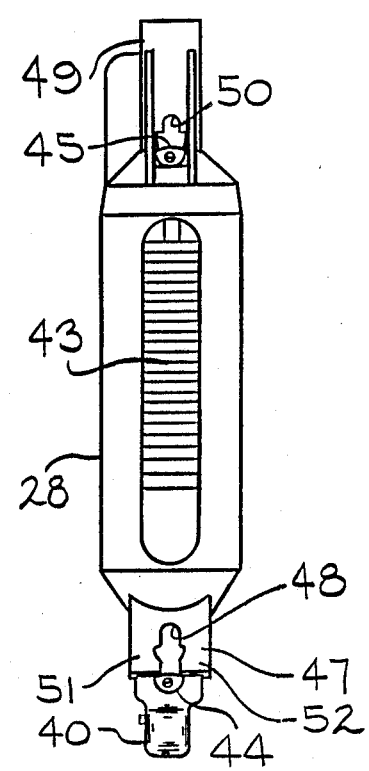
FIG. 8 is a view similar to FIG. 7, but showing the upper portion of the locking bracket stripped off the mounting boss on the shaft of the height sensor, as occurs when the shaft of the height sensor is retracted by lowering the suspension arm of the upside-down vehicle of FIG. 1.
Figure 9:
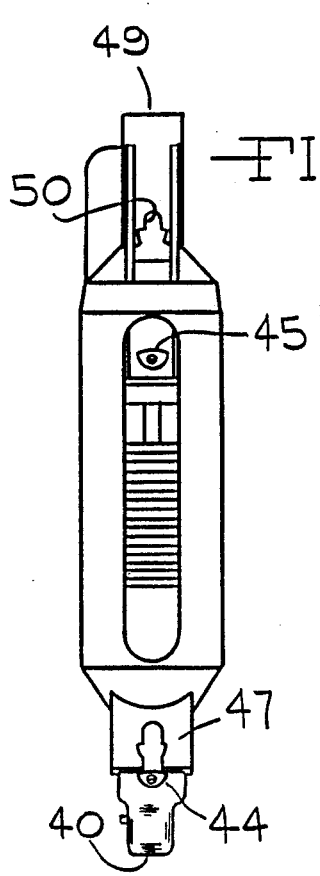
FIG. 9 is a view similar to FIG. 8, but showing a further retraction of the shaft of the height sensor to effect complete separation of the locking bracket from the height sensor.

In FIGS. 8 and 9, lowering of the suspension arm 27 has retracted the shaft 26 into the housing 24 and moved the bosses 44 and 45 closer together, causing the generally flat upper surface of the boss 44 to engage and push up on the lower end of the flat portion 47, as more clearly shown in FIG. 8B, and thereby push the flat portion 49 off the boss 45, as more clearly shown in FIG. 8A. The lower surface of the boss 45 acts as a rounded wedge.

Figure 10:
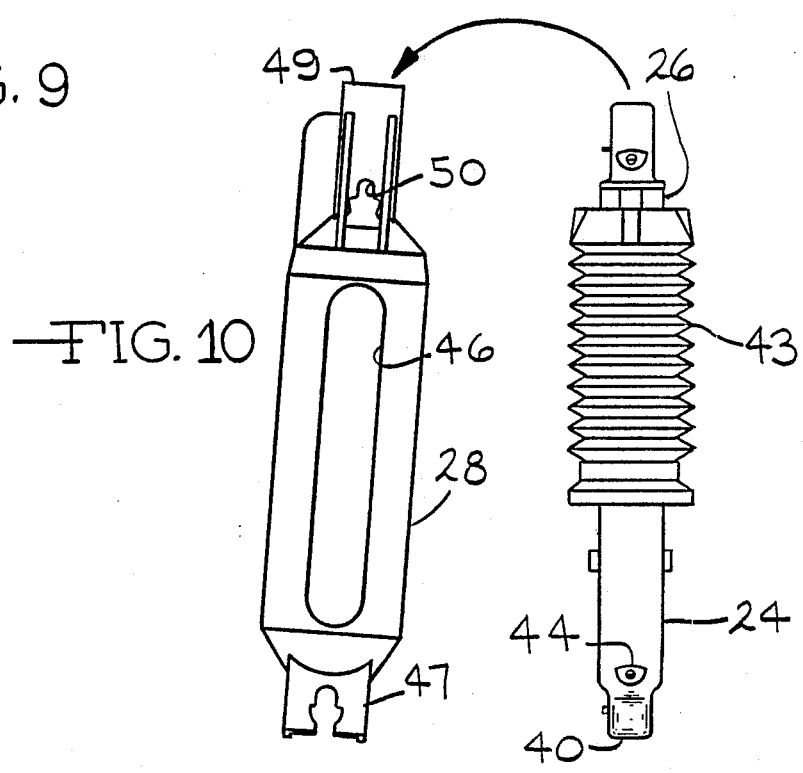
FIG. 10 is a schematic view intended to illustrate the complete separation of the locking bracket from the height sensor.

FIG. 10 is a schematic representation of the locking bracket 28 falling away after automatic stripping, with the housing 24 and shaft 26 again being shown in their normal relative position.

The bosses 44 and 45 are shown as separate pieces screwed respectively to the housing 24 and the shaft 26. If desired, the bosses 44 and 45 may be molded as integral parts respectively of the housing 24 and the shaft 26.

Various modifications may be made in the structure shown and described without departing from the spirit and scope of the invention. It should be noted that the boss 44 extends far enough from the housing 24 that it will nevertheless engage the lower end of the flat portion 47, upon retraction of the shaft 26 into the housing 24, even though the bracket 28 might become slightly cocked with respect to the height sensor 22 upon stripping of the legs 51 and 52 of the flat portion 47 from the boss 44 by the prior extension of the shaft 26 from the housing 24.

The invention is claimed as follows:

1. An assembly comprising a height sensor for an automotive vehicle, the height sensor including a telescoping housing and shaft each provided with a boss, and an elongate calibration bracket having a pair of apertures disposed respectively adjacent opposite ends and respectively receiving said bosses, whereby the calibration bracket temporarily locks the housing and shaft in a predetermined relationship with respect to each other.

2. An assembly as claimed in claim 1 wherein the bosses of the height sensor and the apertures of the calibration bracket are so shaped as to automatically strip the bracket from the height sensor, after installation of the height sensor and calibration bracket assembly on an automotive vehicle, upon extension of the shaft from the housing and successive retraction of the shaft into the housing.

3. An assembly as claimed in claim 1 wherein the calibration bracket is generally arcuate in cross section and partially surrounds the height sensor when mounted thereon.

* * * * *